June 29, 1943.                A. VENDITTY                    2,323,260
                                FASTENER
                          Filed Feb. 26, 1942              2 Sheets-Sheet 1
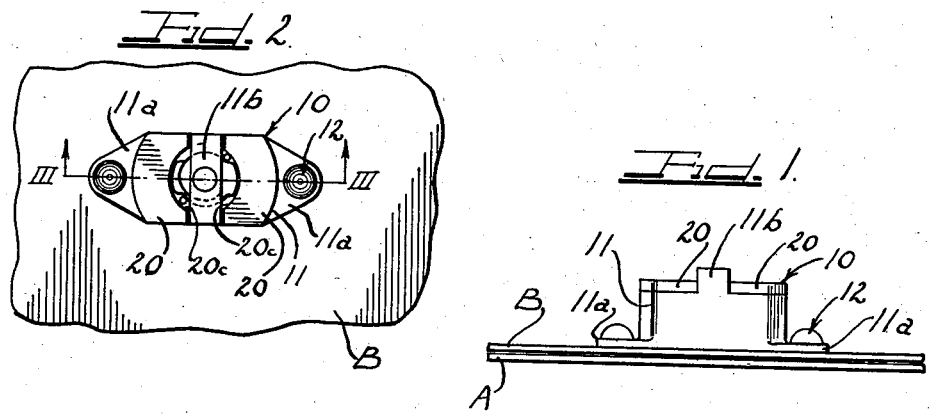
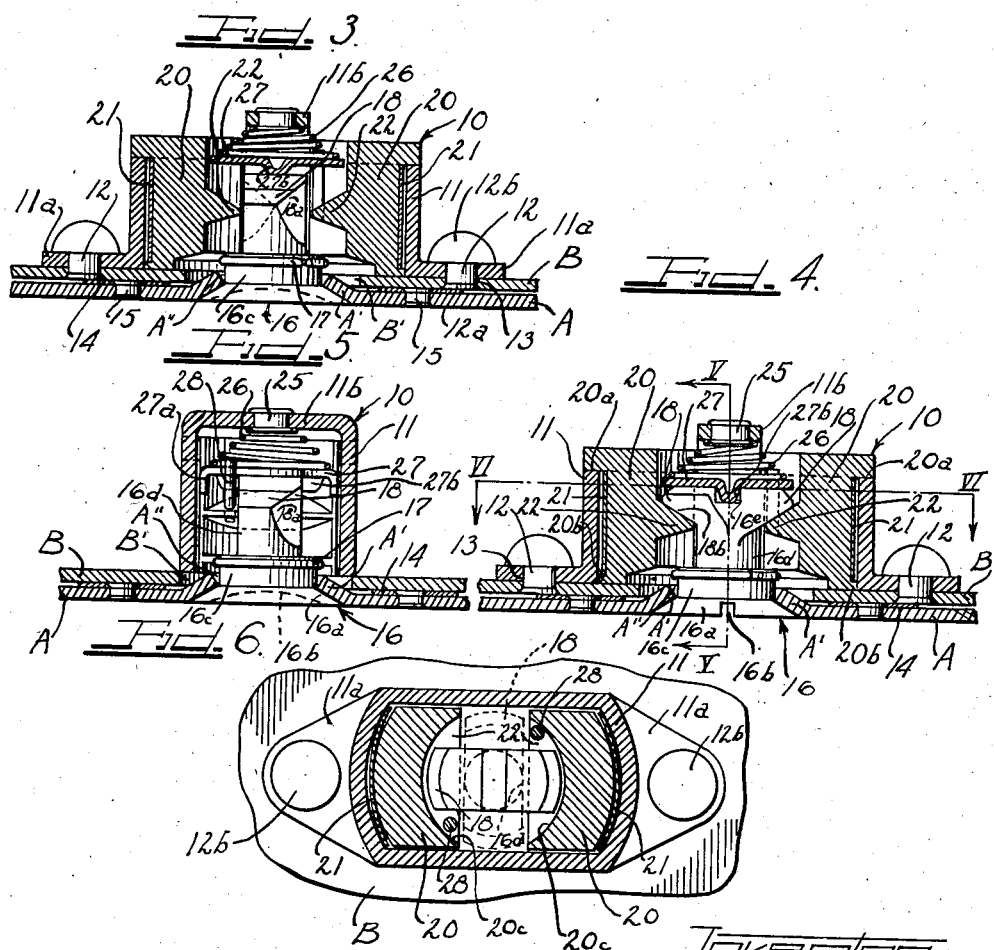
Inventor
ANTHONY VENDITTY

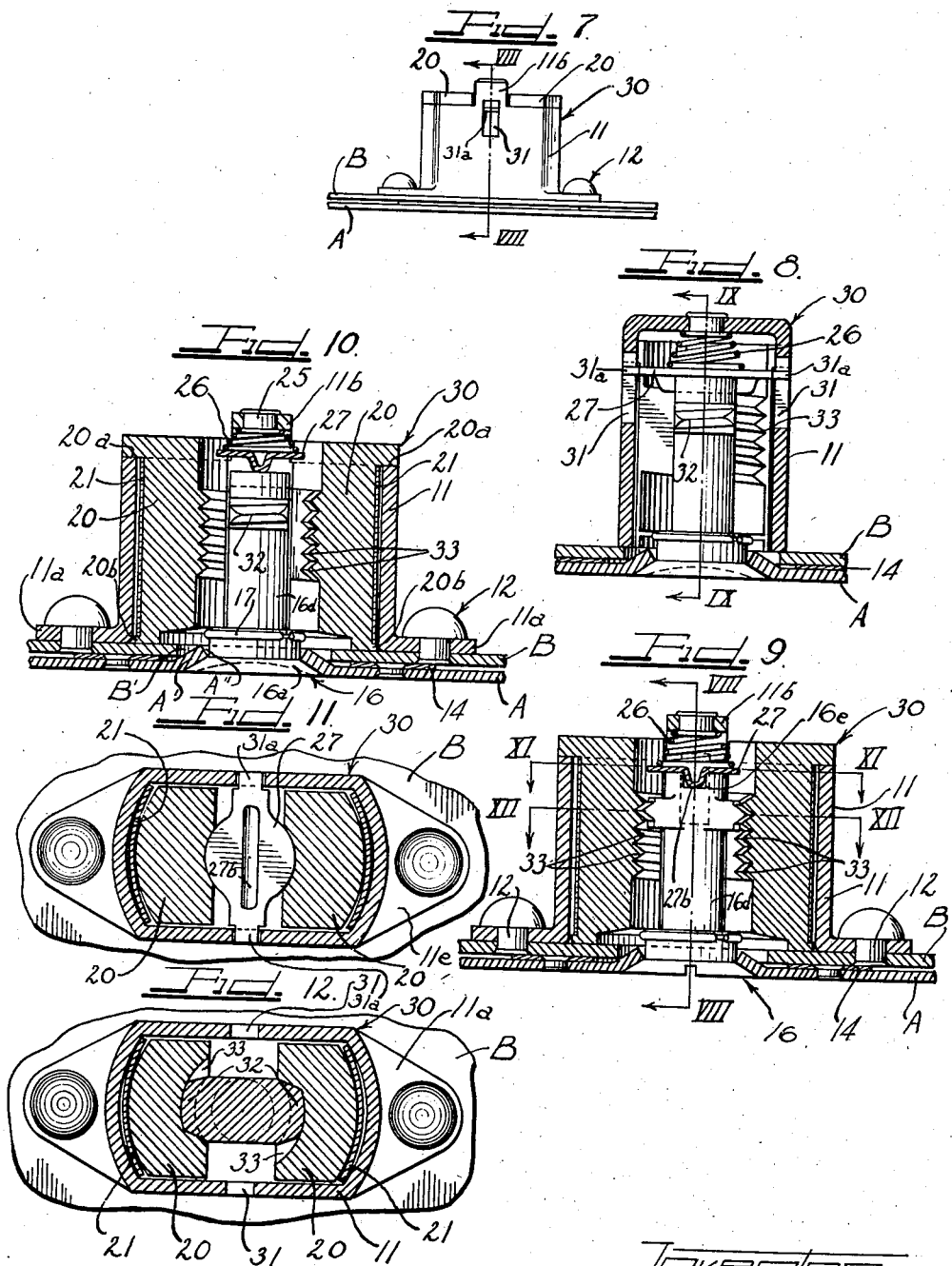

Patented June 29, 1943

2,323,260

UNITED STATES PATENT OFFICE 2,323,260

FASTENER

Anthony Venditty, Detroit, Mich., assignor to Thompson Products, Incorporated, Cleveland, Ohio, a corporation of Ohio Application February 26, 1942, Serial No. 432,399

9 Claims. (Cl. 24—221)

This invention relates to fasteners adapted for detachably connecting a plurality of apertured plates. The fasteners of this invention are especially useful for mounting cowling pieces around an airplane motor.

More specifically the invention relates to receptacles having spring urged toothed blocks and spring urged locking means together with studs insertable into the receptacle and having cooperating teeth for engagement with the toothed blocks as well as recesses for receiving the spring urged locking means.

The fasteners of this invention lock and unlock upon quarter-turn rotation of a locking stud. The locking stud has a head portion adapted to be rotatably mounted in the aperture of a plate, a shank portion adapted to extend into the receptacle part of the fastener, locking cams on the shank portion adapted to cooperate with the receptacle part, and a recess or groove in the end of the shank to receive a spring urged portion of the receptacle part for controlling quarter-turn movement of the stud.

The receptacle part of the fastener includes a housing adapted to be secured onto the inner face of a second plate around an aperture in said plate, a pair of spring urged locking blocks in the housing for cooperating with the locking cams on the stud shank, and a spring urged plate for riding on the end of the stud in and out of the groove or recess therein so that the stud will not rotate due to vibration of the plates or fastener parts.

The cam surfaces on the stud are inclined so as to pull the stud into the housing as the stud is being rotated into locked position. The faces of the spring-urged blocks in the fastener receptacle which receive the cam surfaces of the stud are also inclined so that when the stud is in locked position the springs acting on the blocks will tend to force the inclined surfaces thereon toward the stud shank and, in so doing, will further pull the stud into the housing thereby maintaining the parts in tight relation.

In one form of the invention the spring urged blocks can have a plurality of stud cam receiving surfaces along the length of the blocks so as to render the fastener useful for securing together plates of different thicknesses. Thus when thick plates are used the cam on the stud will engage a set of locking teeth or surfaces on the receptacle blocks which are close to the plates. When thinner plates are used the stud can project further into the housing to cooperate with another set of locking surfaces on the spring urged blocks.

Even though one set of locking surfaces are provided in the fastener receptacle, some slight variation in plate thicknesses can be accommodated because the spring urged blocks in the receptacle have inclined locking teeth and, when thick plates are used, the locking cam surfaces on the stud can ride on the lower portions of the teeth since the blocks can be forced apart by stressing of the springs which urge them toward the stud.

It is, then, an object of this invention to provide fasteners adapted for detachably connecting a plurality of parts such as apertured plates.

A further object of the invention is to provide a fastener having one set of spring urged means for locking the fastener parts in assembled relation, and a second spring urged means for holding the fastener parts in assembled relation.

A still further object of the invention is to provide a fastener adapted to be locked and unlocked upon quarter turn reverse rotation of a stud portion thereof and having an independent spring urged means for holding the stud in locked position.

A still further object of the invention is to provide a fastener including a receptacle and a stud wherein the fastener has spring urged blocks adapted to coact with cam surfaces on the stud.

A still further object of the invention is to provide a fastener having a plurality of different locking positions so as to accommodate the locking together of different sized parts.

A still further object of the invention is to provide a fastener including a fastener receptacle having a spring urged stud locking means and a cam locking instrumentality independent of said spring urged means.

Other and further objects of the invention will be apparent of those skilled in the art from the following detailed description of the annexed sheets of drawings which, by way of preferred example, illustrate two embodiments of the invention.

On the drawings:

Figure 1 is a side elevational view of one form of fastener according to this invention having the fastener parts thereof mounted on a pair of flat apertured plates.

Figure 2 is a top plan view of Figure 1.

Figure 3 is an enlarged vertical cross-sectional view, with parts in elevation, taken along the line III—III of Figure 2 and illustrating the fastener parts in unlocked position.

Figure 4 is a view similar to Figure 3 but illustrating the fastener parts in locked position.

Figure 5 is a vertical cross-sectional view taken along the line V—V of Figure 4.

Figure 6 is a horizontal cross-sectional view taken along the line VI—VI of Figure 4.

Figure 7 is a side elevational view of a second form of fastener according to this invention illustrating the same in mounted relation on a pair of plates.

Figure 8 is an enlarged vertical cross-sectional view, with parts in elevation, taken along the line VIII—VIII of Figure 7, or along the line VIII—VIII of Figure 9.

Figure 9 is a vertical cross-sectional view, with parts in elevation, taken along the line IX—IX of Figure 8.

Figure 10 is a view similar to Figure 9 but illustrating the fastener parts in unlocked position.

Figure 11 is a horizontal cross-sectional view taken along the line XI—XI of Figure 9.

Figure 12 is a horizontal cross-sectional view taken along the line XII—XII of Figure 9.

As shown on the drawings:

In Figures 1 to 6 inclusive the reference numeral 10 illustrates generally the first form of fastener detachably connecting a pair of apertured plates A and B. The fastener includes a receptacle or housing 11 with laterally extending apertured ears 11a at the bottom receiving therethrough the shanks of rivets 12. These rivets 12 extend through apertures 13 in the plate B which have a countersunk end at the bottom face of the plate to receive the heads 12a of the rivets 12. The rivet heads are preferably flush with the face of the plate B. The rivet shanks can be headed as at 12b over the ears 11a to fixedly secure the receptacle 11 on the plate B.

The plate A is embossed as at A' to provide a dimple or depression in the outer face of the plate. The bottom of the depression has an aperture A'' therethrough.

A comparatively thin flat metal annulus 14 can, if desired, be riveted onto the inner or top face of the plate A around the embossment A' thereof by means of rivets such as 15. This thin annulus 14 acts as a shim and somewhat separates the plates A and B. It makes possible a deflection of the embossment A' into an aperture B' of the plate B around which the receptacle 11 is mounted. The annulus can be entirely eliminated inasmuch as it is not essential to the operation of the fastener.

The fastener includes a locking stud 16 rotatably mounted in the aperture A'' of the plate A. The stud 16 has an enlarged head portion 16a adapted to seat in the embossed portion A' of the plate A so that when the stud and receptacle are in locked relation the stud head 16a will be flush with the outer face of the plate A.

The stud head 16a has a screwdriver slot 16b therein for rotation of the stud.

A cylindrical intermediate portion 16c extends from the head 16a of the stud and has a peripheral groove therearound adapted to receive a snap ring 17 which, when seated in the groove, has an outside diameter greater than the diameter of the aperture A''. The snap ring 17 and the head 16a will therefore hold the stud 16 in rotatable relation in the aperture A'' of the plate A.

The stud 16 has a cylindrical shank portion 16d of smaller diameter than the portion 16c for projecting into the receptacle 11. Locking instrumentalities such as prongs 18 extend outwardly from opposite sides of the stud shank 16d. These prongs 18 have inclined or beveled bottom surfaces 18a extending downwardly from near the top end of the stud shank to other inclined bottom surfaces 18b on the prongs. The surfaces 18a when contacted with the cooperating locking means in the receptacle 11, will serve to pull the stud further into the receptacle with a screwthread-like action so as to pull the plates tightly together. When the quarter-turn rotation of the stud is completed, however, the surfaces 18b will cooperate with the cooperating locking instrumentalities in the receptacle.

The top end of the stud has a transverse groove 16e extending thereacross as best shown in Figure 4, for a purpose to be hereinafter more fully described.

The housing 11 contains a pair of opposed locking blocks 20 which have outturned flanges 20a at the top ends thereof overlying the top of the housing together with outturned flanges 20b at the bottom thereof disposed within the housing.

Leaf or plate springs 21 are disposed around the outer faces of the blocks 20 and extend between the flanges 20a and 20b. These springs urge the blocks 20 toward each other.

Each block 20 has an arcuate inner face 20c as best shown in Figures 2 and 6. These inner faces or walls of the blocks cooperate to define a chamber through the center of the receptacle or housing 11 for receiving the shank of the locking stud.

A tooth 22 projects inwardly from each arcuate face 20c of the blocks intermediate the top and bottom of the blocks. The teeth 22 are disposed in opposing aligned relation and have inclined upper surfaces for receiving thereover the inclined bottom surfaces on the prongs 18 of the stud when the stud is rotated into locking position.

As shown in Figure 6 the stud shank 16d of the shank can fit freely between the teeth 22 and the prongs 18 projecting laterally from the opposite sides of this shank can also fit freely between the teeth when these prongs are rotated into the dotted line position. However, when the stud is rotated to move the prongs 90° from the dotted line position, the same will ride over the teeth 22 to lock the parts together.

From the above description it will be evident that the stud and receptacle can be detachably connected upon mere quarter-turn rotation of the stud in the receptacle.

In order to prevent unauthorized rotation of the stud to unlocked position, the housing 11 is provided with a strap or top wall 11b spanning the space between the blocks 20. This strap 11b has a stud or ferrule 25 extending therethrough for centering the end coil of a coil spring 26. The bottom coil of this spring 26 acts against a plate 27 disposed between the blocks 20 and having downturned end walls 27a as best shown in Figure 5 for extending between the blocks 20 to form inner abutments for the blocks and thereby maintain the same in assembled relation in the housing 11. It will be also noted from Figure 2 that the strap 11b extends between the top ends of the blocks to hold the same in separated position.

The plate 27 has a downwardly extending longitudinal rib 27b adapted to ride on the end of the stud before the stud is rotated to locked position and adapted to snap into the groove 16e in the stud end when the stud is rotated to locked position. This rib therefore serves to hold the stud against unauthorized rotation out of locked engagement with the teeth 22 of the blocks 20.

While the legs 27a of the plate 27 extend between the inner ends of the blocks 20, and therefore themselves serve to hold the plate against rotation, it may be desirable to further insure against possible rotation of the plate 27 by fixedly securing pins 28 in the teeth 22 and allowing these pins 28 to project upwardly from the teeth into abutment with opposite sides of the plate 27.

The spring 26 will constantly urge the plate downwardly between the blocks 20 but the plate cannot be forced past the teeth 22 on the blocks. When the stud 16 is inserted into the receptacle between the blocks it will engage the plate and compress the spring 26 as shown in Figure 3. As the stud is rotated to move the prongs 18 over the teeth 22, the sloping undersurfaces 18a and 18b of the prongs together with the upwardly sloping top surfaces of the teeth will pull the stud further into the receptacle and, upon completion of a quarter turn rotation, the groove 16e on the stud will be brought into alignment with the rib 27b of the plate and the spring 26 will push the plate downwardly to seat the rib in the groove thereby holding the stud against further unauthorized rotation in either direction.

The blocks 20 may be somewhat urged apart as the stud is rotated into locking position to compress the plate springs 21. Since the upper faces of the teeth 22 are inclined, upon completion of the locking the plate springs will tend to force the blocks toward the stud and push the inclined top surfaces of the teeth further under the surfaces 18b of the prongs thereby preventing any looseness from developing between the locked together fastener parts.

If an annulus 14 is used, the drawing of the stud into the receptacle by virtue of the inclined cooperating cam surfaces or locking teeth may be strong enough to resiliently deflect the embossment A' of the outer plate A, since this embossment is not backed up by any rigid member due to its spacing from the plate B provided by the annulus 14. This inward springing of the embossment or dimple A' will additionally serve to hold the parts in tight cooperating locked position. The annulus 14 also acts as a shim to give the effect of a thicker plate A so as to line up the stud prongs with the teeth of the blocks in the event that plates A and B are too thin for this purpose. The shim therefore extends the range of use of the device. Shims can be furnished in different thicknesses and can be interposed between the plates A and B as the annulus 14 or can be positioned between the plate B and housing 11.

In the second modification disclosed in Figures 7 to 12, parts substantially identical with parts described in Figures 1 to 6 have been marked with the same reference numerals and characters.

The fastener 30, as shown in Figures 7 to 12, has a somewhat higher housing 11 than the housing 11 of the fastener 10, and has a somewhat longer stud than the stud 16 of the fastener 10. However, outside of these differences in size, the parts are substantially identical. The blocks 20 are sized to fit the housing 11.

The housing has vertical slots 31 in opposite sides thereof aligned beneath the strap 11b. These slots receive projecting tangs or ears 31a on the ends of the plate 27 so as to guide the plate in its up and down movement and positively prevent rotation of the plate in the housing.

The stud shank 16d has a pair of opposed inclined teeth 32 intermediate the ends thereof.

Instead of one tooth being formed on each block 20, the blocks contain a plurality of superimposed inclined teeth 33 intermediate the ends of the blocks. Thus the teeth 32 on the stud are adapted to engage whichever set of teeth on the blocks is disposed adjacent thereto and, as a result, the fastener 30 is universally useful for securing together plates such as A and B, even though the plates be thick or thin. For example, if thin plates are used, or if more than two plates are to be fastened together so that intermediate plates or other parts are disposed between the plates A and B, the stud will engage a set of teeth 33 nearer the lower end of the receptacle. The locking plate 27 can travel for a sufficient distance so that it will act against the stud end in various positions of the stud. As a result of this multi arrangement of teeth on the blocks the fastener is made useful throughout a wide field for detachably connecting parts of many different sizes.

The inclined relationship of the teeth 32 and 33 will tend to pull the stud further into the housing as it is rotated toward locked position.

The rib 27b of the plate 27 rides on the end of the stud until it is aligned with the recess 16e in the stud whereupon the spring 27 will snap the rib into the recess to hold the stud against rotation. The parts thus cooperate in a manner similar to that described in connection with the fastener 10.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A fastener comprising a receptacle, a plurality of locking blocks in said receptacle, springs urging said locking blocks toward each other, a spring pressed rib member in said housing, a locking stud insertable into said housing between said locking blocks, locking instrumentalities on said stud adapted to cooperate with the locking blocks for maintaining the stud in the housing, and said stud having a recessed end adapted to receive said rib member into the recess thereof when the stud is rotated to locked position in the housing.

2. A fastener comprising a locking stud having locking instrumentalities thereon, a receptacle having spring urged locking blocks therein adapted to receive the stud therebetween and cooperate with the locking instrumentalities on the stud for holding the stud in the receptacle, and a spring pressed member cooperating with said stud to hold the same against unauthorized rotation in the receptacle.

3. A fastener comprising a housing, a plurality of toothed members in said housing, spring means urging said toothed members toward each other, a stud insertable into said housing between the toothed members having locking prongs thereon adapted to ride over the teeth of said members upon relative rotation between the stud and receptacle, and means in said receptacle adapted to cooperate with said stud for holding the same in locked position against unauthorized rotation.

4. A fastener comprising a receptacle having spaced opposed locking teeth, spring means urging said locking teeth toward each other, a stud having a shank insertable between said locking teeth, prongs on said shank ridable over said teeth to engage the stud in the receptacle, and a separate spring-urged member in said receptacle cooperating with said stud in locked position to hold the stud against unauthorized rotation.

5. A fastener adapted to detachably connect a plurality of apertured plates which comprises a stud adapted to be rotatably mounted in the aperture of the outermost plate, a receptacle for said stud adapted to be fixedly mounted around the aperture of the innermost plate, said stud having a shank adapted to project into said receptacle, locking instrumentalities on said shank, spring urged locking means in said receptacle adapted to cooperate with said locking instrumentalities on the stud shank for holding the plates in assembled relation, and an independent spring urged ribbed member in said receptacle adapted to cooperate with said stud to hold the same in locked position.

6. A separable fastener comprising an open ended receptacle, a pair of opposed blocks in said receptacle, teeth projecting inwardly from said blocks, means holding said blocks in spaced opposed relation, spring means urging said parts toward each other, a locking stud adapted to fit between the teeth of said blocks in one position thereof and engage the teeth in another position thereof, and a spring urged means in said receptacle holding said stud in said another position.

7. A fastener for a plurality of apertured parts which comprises an open ended housing adapted to be fixedly disposed around the aperture of one of said parts, a stud adapted to be rotatably mounted in the aperture of another of said parts, locking cams on said stud, spring urged tooth members in said receptacle adapted to be engaged by said cams when said stud is rotated in said housing, and said spring urged locking members having inclined surfaces acting on the locking cams of the stud to draw the stud into the receptacle.

8. A fastener comprising a receptacle, a series of superimposed spaced opposed locking instrumentalities in said receptacle, a stud having a shank with locking instrumentalities thereon insertable into said receptacle and rotatable for one quarter turn to move the shank carried locking instrumentalities into engagement with whatever opposed locking instrumentalities are opposite the same at the time of rotation of the stud whereupon said stud has a plurality of locked positions at different levels in the receptacle.

9. A fastener comprising a housing, a pair of spaced opposed locking blocks in said housing, each of said locking blocks having a plurality of superimposed teeth, spring means in said housing urging said locking blocks toward each other, a stud having a shank portion freely insertable into said receptacle between the locking blocks, and opposed teeth on said shank portion engageable with the teeth on the locking blocks whereby said stud can be inserted for a desired distance into the receptacle and rotated a quarter turn to engage a pair of spring pressed teeth.

ANTHONY VENDITTY.